(12) United States Patent
Izumi

(10) Patent No.: US 6,177,912 B1
(45) Date of Patent: Jan. 23, 2001

(54) IMAGE DISPLAY DEVICE

(75) Inventor: Yoshihiro Izumi, Kashihara (JP)

(73) Assignee: Sharp Kabushiki Kaisha, Osaka (JP)

(*) Notice: Under 35 U.S.C. 154(b), the term of this patent shall be extended for 0 days.

(21) Appl. No.: 09/070,642

(22) Filed: Apr. 30, 1998

(30) Foreign Application Priority Data

Jun. 18, 1997 (JP) .................................................. 9-161464

(51) Int. Cl.[7] .................................................... G09G 5/00
(52) U.S. Cl. ............................................................... 345/1
(58) Field of Search .................................. 345/1, 2, 3, 4, 345/5, 6, 7, 8; 348/73, 58; 359/457; 349/73

(56) References Cited

U.S. PATENT DOCUMENTS

| | | | |
|---|---|---|---|
| 5,661,531 | * 8/1997 | Greene et al. | 348/73 |
| 5,673,091 | * 9/1997 | Boisdron et al. | 348/58 |
| 5,708,528 | * 1/1998 | Furuya | 359/457 |
| 5,812,226 | 9/1998 | Izumi et al. | 349/73 |
| 5,813,226 | 9/1998 | Izumi et al. | 349/73 |
| 5,889,568 | 3/1999 | Seraphim et al. | 349/73 |
| 5,903,328 | * 5/1999 | Greene et al. | 349/73 |

FOREIGN PATENT DOCUMENTS 8-122769   5/1996  (JP) .

* cited by examiner

*Primary Examiner*—Vijay Shankar
(74) *Attorney, Agent, or Firm*—Dike, Bronstein, Roberts & Cushman, LLP; David G. Conlin; William J. Daley, Jr.

(57) ABSTRACT

An image display device includes a display panel provided with a light-shield on a portion shifted upward from a center in a thickness direction and a display panel provided with a light-shield on a portion shifted downward from a center in a thickness direction, the display panels being connected adjacent to each other. The light-shields of the two display panels are overlapped with each other with respect to the entire region between the display panels, thus completely sealing a gap between the display panels by the light-shields. This prevents leakage of light between the display panels even when display panels having large profile irregularity on edge surfaces are connected adjacent to each other. As a result, an image display device capable of displaying a natural image on a large screen is realized.

18 Claims, 13 Drawing Sheets

MAGNIFIED VIEW

IMAGE DISPLAY DEVICE

FIELD OF THE INVENTION

The present invention relates to an image display device for use in AV (Audio and Visual) devices and OA (Office Automation) devices.

BACKGROUND OF THE INVENTION

Conventionally, various image display devices such as a home television set have been adopted in AV devices and OA devices. Such an image display device includes, for example, a CRT (Cathode Ray Tube), a liquid crystal display device, a plasma display device (Plasma Display Panel), an EL (electroluminescent) display device, an LED (Light Emitting Diode) display device, and other types of devices.

In recent years, there has been a demand for making these image display devices lighter, thinner, less power consuming, and finer, and making the display larger. To this date, many display devices meeting such a demand have been developed, and some of them have already been used in actual application.

Of various display devices as mentioned above, the liquid crystal display device has such advantages in that, compared with other display devices, the thickness (depth) is far thinner, the power consumption is low, and a full color can be realized with ease. For this reason, the liquid crystal display device has been used in a variety of fields in various ways, and is considered to be the best candidate for realizing a larger screen.

However, in order to realize a liquid crystal display device with a larger screen, the following problem must be overcome. That is, in the liquid crystal display device, when the screen is made larger, the fraction defective is abruptly increased due to breakage of a signal wire and a pixel failure in the manufacturing process. This inevitably raises the price of the liquid crystal display device.

In order to solve this problem and to realize a larger screen, a variety of liquid crystal display devices of the multi-panel system have been suggested. In the liquid crystal display devices of the multi-panel system, a plurality of liquid crystal panels are connected to one another so as to constitute a single liquid crystal display device.

However, in the liquid crystal display devices of the multi-panel system, the connected portion between liquid crystal panels, namely, a "seam" between liquid crystal panels becomes noticeable on the display. This is caused by the light from the backlight leaking through a gap at the connected portion between liquid crystal panels. Thus, in order to realize a liquid crystal display device capable of natural displaying on a large screen, a technique for disguising the seam is needed.

In order to realize such technique, the applicants of the present invention have suggested a liquid crystal display device adopting a new type of the multi-panel system in Japanese Unexamined Patent publication No. 122769/1996 (Tokukaihei 8-122769). FIG. 11 is a cross sectional view which schematically shows, as such a liquid crystal display device, the arrangement of a liquid crystal display device 101.

As shown in FIG. 11, the liquid crystal display device 101 is provided with a plurality of liquid crystal panels 102 of the active matrix type. In the following, for simplicity, explanations will be given through the case where the number of liquid crystal panel 102 of the liquid crystal display device is two.

A liquid crystal panel 102 has an arrangement wherein a TFT substrate 103 and a CF substrate 104 are combined with each other by a sealant 105, and liquid crystal 106 is enclosed therebetween. The liquid crystal panels 102 are connected adjacent to each other by an adhesive 108 to a large reinforcing substrate 107 having substantially the same refractive index as that of glass from which the TFT substrate 103 and the CF substrate 104 are made.

On substantially the entire surface of the outer side of the reinforcing substrate 107, a polarizing plate (polarizer) 109 is provided. Also, on substantially the entire surface of the outer side of the liquid crystal panels 102, a polarizing plate (polarizer) 110 is provided. The polarization axes of the polarizing plates 109 and 110 are orthogonal to each other.

In the described arrangement, leakage of light from the gap between the liquid crystal panels 102 is prevented by the polarizing plates 109 and 110 which are in the Cross Nicole state. However, in the case of adopting, as the adhesive 108 which binds the edge surfaces of the liquid crystal panels 102, adhesive resin, etc., having birefringence, there is a case where the transmitted light from the backlight, which is determined by the polarizing plates 109 and 110, is modulated by the adhesive 108. As a result, even when the polarizing plates 109 and 110 are in the Cross Nicole state, there is a case that the light from the backlight is transmitted through a connected portion 112 of the liquid crystal panels 102, and partial leakage of light is caused.

As a countermeasure, as shown in FIG. 11, FIG. 12, and FIG. 13, on predetermined positions on the edge surfaces of the liquid crystal panels 102 which are connected adjacent to each other, light-shields 51a and 51b, each having a predetermined height (length in a direction perpendicular with respect to the edge surface) are provided, respectively. As shown in FIG. 13, when connecting the edge surfaces of the liquid crystal panels 102, the light-shields 51a and 51b are connected to each other so as to form a light shielding film, filling the gap between the liquid crystal panels 102. With this arrangement, light passing through the connected portion can be blocked by the light shielding film 51, thus preventing leakage of light from the connected portion 112.

Note that, the light-shields 51a and 51b are also known as a side-black, and are made of, for example, a black silicon rubber. The side-black may be provided, as above, on each edge surface of the liquid crystal panels 102, or may be provided on only one of the edge surfaces. Also, the predetermined position where the side-black is to be provided is a position which does not prevent light from passing through display pixels adjacent to the connected portion 112 between the liquid crystal panels 102, and in this case, a substantially central portion on each edge surface of the liquid crystal panels 102 in a direction of the panel thickness. Since detailed explanation of such predetermined position is discussed in the above-mentioned publication, a further explanation thereof is omitted here.

Despite the described advantage, the arrangement of the liquid crystal display device 101 presents the following problems.

For example, in the case of making a 40 inch (approximately 80 cm×60 cm) multi-panel liquid crystal display device 101 by connecting two 29 inch (approximately 40 cm×60 cm) liquid crystal panels 102, the length in the lengthwise direction on the edge surfaces of the liquid crystal panels 102 at the connected portion 112 becomes substantially 60 cm, and a side-black having a height of substantially 30 $\mu$m is formed on each of the edge surfaces along the length of substantially 60 cm.

FIG. 14 is an explanatory drawing which shows how the glass substrate is cut by a dicing process using a diamond blade. As shown in FIG. 14, when a liquid crystal panel, made of the glass substrate, having a thickness of substantially 2 mm is cut along the cutting line of substantially 60 cm, the cutting edge surface takes the shape of X–Z plane in FIG. 14, with a profile irregularity of substantially 20 μm to 30 μm. Note that, here, the profile irregularity is the distance between the crest and the trough of the waviness on the cutting edge surface of the substrate in Y direction.

Possible reasons for the profile irregularity in the above range are ① reduced mechanical accuracy of a dicing device as a result of adopting a large dicing device in accordance with the work size (size of glass substrate to be cut) and ② wobbling blade rotating at a high speed as a result of increased processing speed in accordance with a cutting distance of substantially 60 cm.

When the liquid crystal panels 102 having such a profile irregularity is connected adjacent to each other, as shown in FIG. 15, there is a case that convex portions 102a or concave portions 102b of the cutting edge surfaces make a contact with each other. In such a case, while a gap 113 at the connected portion 112 where the convex portions 102a make a contact with each other is completely sealed by the side-black, at the portion where the concave portions 102b make a contact with each other, the gap 113 is not completely sealed by the side-black.

The following describes the reason for this. Namely, in the arrangement of the liquid crystal display device 101, as shown in FIG. 13, the apices of the light-shields 51a and 51b, which are side-black provided on the liquid crystal panels 102, make a contact with each other. For this reason, the gap between the liquid crystal panels 102 cannot be made narrower than the portion where the convex portions 102a on the edge surfaces are adjacent to each other. As a result, at the portion where the concave portions 102b are adjacent to each other, the gap 113 between the liquid crystal panels 102 is not sealed by the side-black provided on each of the concave portions 102b.

When the gap 113 is present, in the arrangement of the conventional liquid crystal display device 101, even when the polarizing plates 109 and 110 (see FIG. 11) are in the Cross Nicole state, leakage of light is caused through the gap 113.

As means to solve this problem, for example, a method in which the cutting edge surface of the liquid crystal panel 102 prepared by dicing process is smoothed so as to obtain a profile irregularity in an order of several μm. However, this method adds the number of manufacturing steps and lowers operativity, and therefore is not preferable.

SUMMARY OF THE INVENTION

The present invention offers a solution to the above-mentioned problem, and accordingly it is an object of the present invention to provide an image display device having a large screen composed of a plurality of display panels, capable of displaying a natural image on a large screen without noticeable connected portions of the display panels.

In order to achieve the above-mentioned object, an image display device of the present invention includes a plurality of display panels connected to one another so as to constitute a large screen, and a light-shield provided on each of the display panels without a gap at the connected portion.

With this arrangement, the light-shield is provided on each connected portion between the display panels. The light-shield is provided in such a manner as to seal the connected portion without a gap. For example, the light-shield is provided on an edge of each display panel so as to be overlapped with another light-shield at the connected portion between display panels.

With this arrangement, even when a plurality of display panels having edges with small waviness are connected adjacent to each other, by the light-shield provided on the connected portion of the display panels without a gap, it is ensured that leakage of light is not induced at the connected portion.

That is to say, on the edges of the display panels, small waviness is formed in accordance with the processing accuracy. Thus, at the connected portion of the display panels, a gap is created in accordance with the waviness. In order to overcome this problem, in the described arrangement, the gap is completely sealed by the light-shield so as to prevent leakage of light from the gap. Therefore, even when a plurality of display panels are connected to one another so as to constitute a large screen, it is possible to obtain natural displaying without noticeable connected portions of the display panels.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention.

Figure 2:
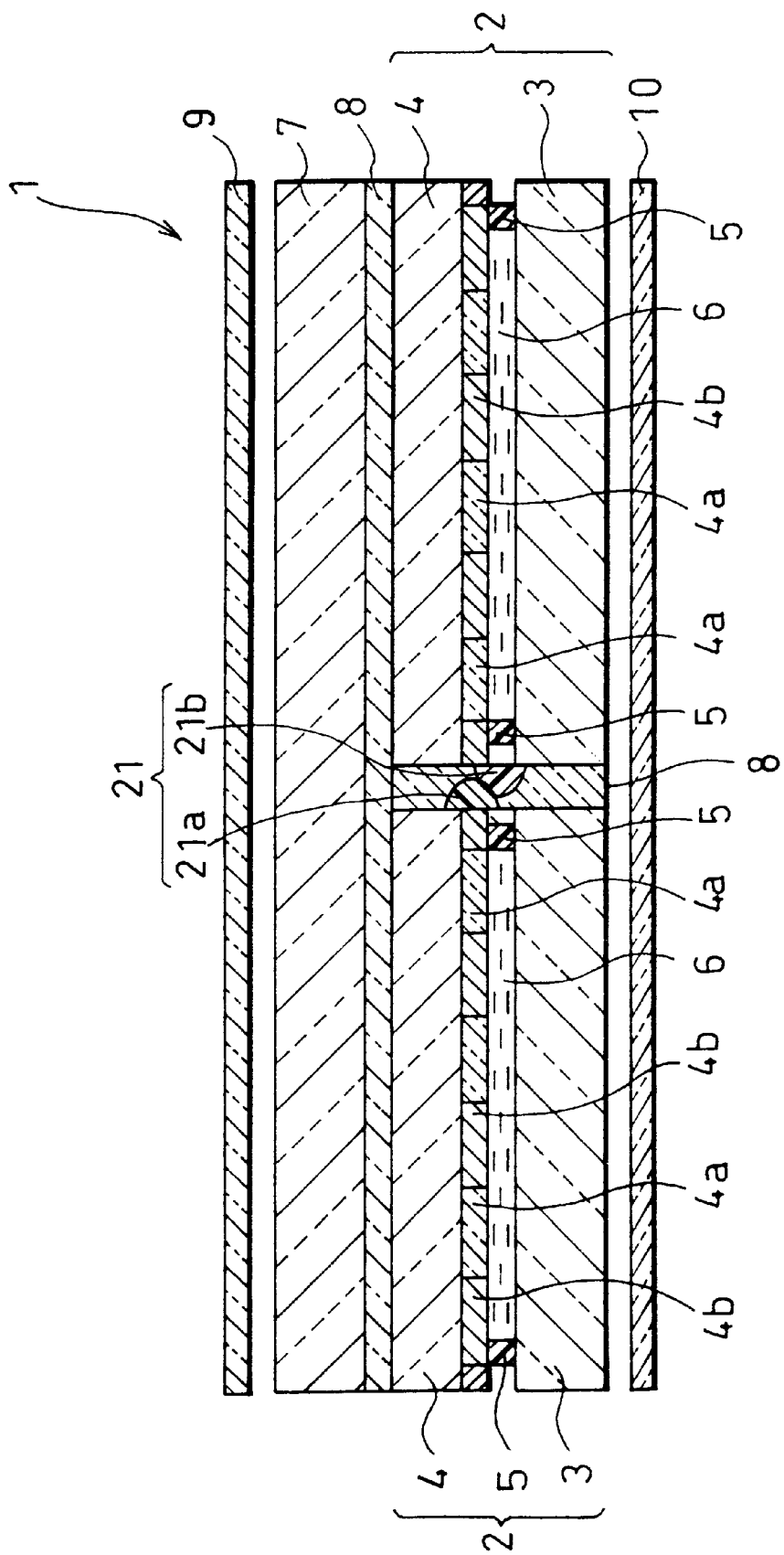
FIG. 2 is a cross sectional view showing an arrangement of a liquid crystal display device which is an image display device in accordance with one embodiment of the present invention.

FIG. 2 is a cross sectional view showing a liquid crystal display device 1 which is an image display device in accordance with the present embodiment. As shown in FIG. 2, the liquid crystal display device 1 has an arrangement wherein a polarizing plate 9, a reinforcing substrate 7, a plurality of liquid crystal panels 2, and a polarizing plate 10 are deposited in this order. In the liquid crystal display device 1, the plurality of liquid crystal panels 2 constitute a large screen. In the following, for simplicity, explanations will be given through the case where the number of liquid crystal panel 2 is two.

A liquid crystal panel (display panel) 2 is a liquid crystal panel of the active matrix type wherein liquid crystal 6 is enclosed between a TFT substrate and a CF substrate 4. The liquid crystal panel 2 includes a thin film transistor (simply referred to as TFT hereinafter) as an active element. Detailed explanations of the liquid crystal panel 2 will be given later.

The reinforcing substrate 7 is a large reinforcing substrate having the same refractive index as that of a glass substrate which is a material of the TFT substrate 3 and the CF substrate 4 of the liquid crystal panel 2. The polarizing plate (polarizer) 9 is provided substantially on the entire surface on the outer side of the reinforcing substrate 7. The polarizing plate (polarizer) 10 is provided substantially on the entire surface of the outer side of the liquid crystal panels 2. The polarizing axes of the polarizing plates 9 and 10 are orthogonal to each other.

On the outer side of the polarizing plate 10, namely, on the back side (bottom side of FIG. 2) of the liquid crystal display device 1, a backlight (not shown) is provided. The backlight is composed of, for example, a cold cathode tube. A liquid crystal panel driver (not shown) is connected to the liquid crystal panels 2. The liquid crystal panel driver is provided so as to output a control signal based on image information to the liquid crystal panels 2. The liquid crystal panels 2 modulate light from the backlight in accordance with the control signal and an image is formed, allowing a viewer to observe image information inputted to the liquid crystal panels 2.

The following describes in detail the arrangement of the liquid crystal panel 2.

As shown in FIG. 2, the liquid crystal panel 2 is provided with the TFT substrate 3 and the CF (Color Filter) substrate 4, both made of a glass substrate. The TFT substrate 3 and the CF substrate 4 are bonded with each other so that pixel electrodes formed on the TFT substrate 3 and common electrodes formed on the CF substrate 4 face each other. The bonding is made by a sealant 5 provided along the peripheries of the TFT substrate 3 and the CF substrate 4. Between the TFT substrate 3 and the CF substrate 4, liquid crystal 6 is enclosed.

Figure 3A:
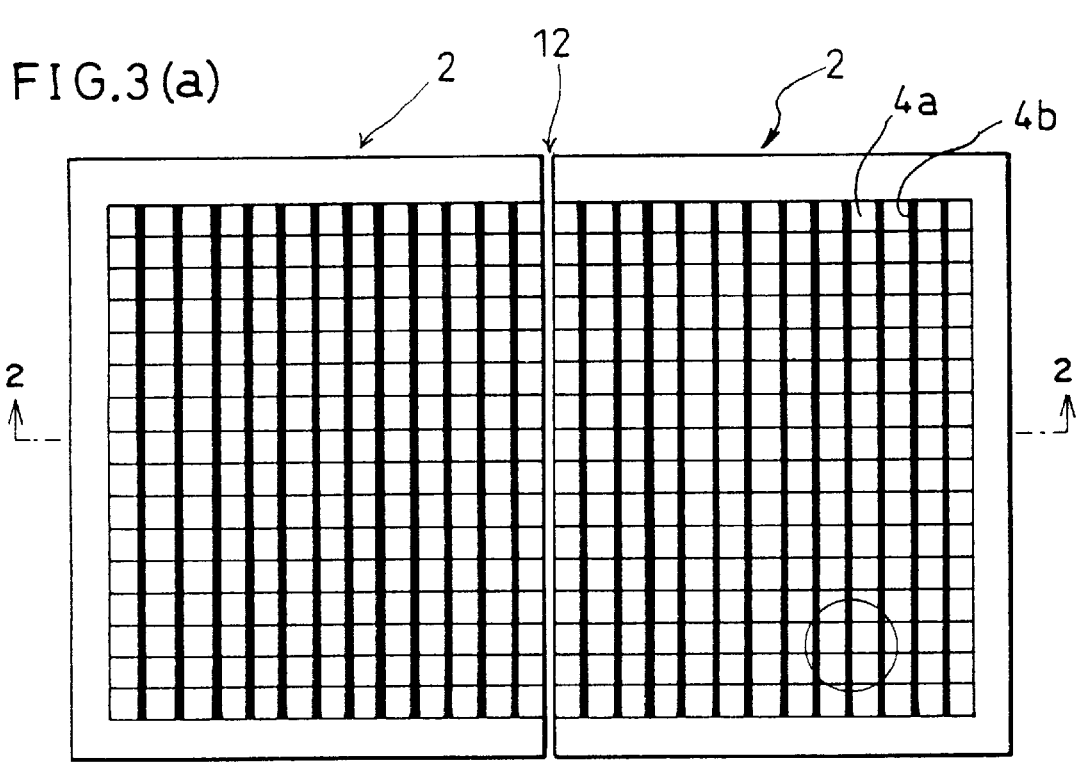
FIG. 3(a) is a plan view showing two liquid crystal panels which are display panels of the liquid crystal display device of FIG. 2.
Figure 3B:
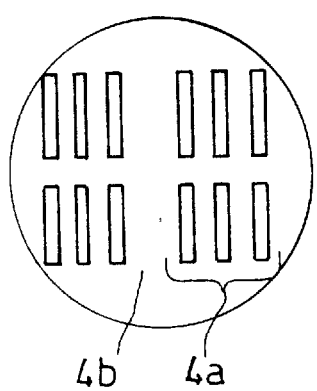
FIG. 3(b) is an explanatory drawing showing a partially magnified view of the liquid crystal panel of FIG. 3(a).

On the TFT substrate 3, TFTs (not shown) are formed in matrix, and on the CF substrate 4, color filters 4a are provided. FIG. 3(a) is a plan view showing the liquid crystal panels 2 of the liquid crystal display device 1 from the side of CF substrates 4, and FIG. 3(b) is an explanatory drawing showing a magnified circled portion of FIG. 3(a). As shown in FIG. 3(a) and FIG. 3(b), on the CF substrate 4, the color filters 4a are positioned in matrix in the pixel aperture region. The CF substrate 4 is also provided with black matrices 4b which separate pixels from one another. Note that, FIG. 2 is a cross sectional view of FIG. 3(a) taken along a line 2—2.

The TFT substrate 3 and the CF substrate 4 are prepared from a large glass substrate which has been cut into a predetermined size. As such a glass substrate, a transparent glass substrate such as barium borosilicate glass 7059 (provided by Corning Inc.) is adopted. To cut the glass substrate, for example, a dicing technique using a diamond blade is adopted.

The dicing technique, compared with a technique by scribing of a diamond (diamond scribing technique) and a technique by scribing of a laser (laser scribing technique), has an advantage that the processing accuracy is superior. The dicing technique has been widely adopted where high processing accuracy is required such as cutting of LSI from a silicon wafer. Table 1 shows dicing conditions when making the TFT substrate 3 and the CF substrate 4.

TABLE 1

| Blade Type | Diamond Blade #400 |
| --- | --- |
| Blade Size | Diameter 127 mm, Thickness 0.3 μm |
| Rotation Speed of Spindle | 12,000 rpm |
| Cutting Speed | 2 mm to 3 mm/sec |

Figure 4:
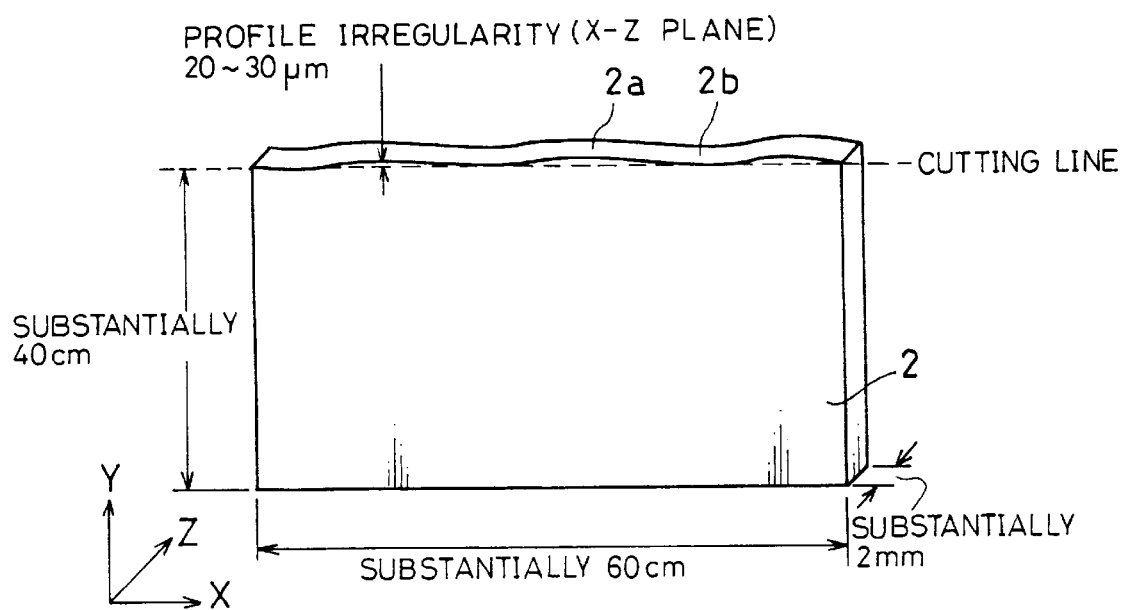
FIG. 4 is an explanatory drawing showing a glass substrate which was cut with a diamond blade.

FIG. 4 is an explanatory drawing showing a glass substrate having a thickness of 2.2 mm and a length of 60 cm, which was prepared in accordance with the conditions of Table 1. As shown in FIG. 4, the profile irregularity of the edge (X–Z plane in FIG. 4) resulting from cutting is 20 μm to 30 μm. Namely, even when the dicing technique having superior processing accuracy is used, small waviness is generated on the cutting edge surface of the glass substrate, and a convex portion 2a and a concave portion 2b are formed on the cutting edge surface of the glass substrate. Since the TFT substrate 3 and the CF substrate 4 are made from the glass substrate, the same profile irregularity is also found on the edge of the liquid crystal panel 2. Thus, the liquid crystal panel 2 also has the convex portion 2a and the concave portion 2b on the edge.

As shown in FIG. 2, on the edge of the liquid crystal panel 2, namely, on the edge of the liquid crystal panel 2 contacting the other liquid crystal panel 2, a light-shield 21a or a light-shield 21b is provided. The light-shields 21a and 21b are provided on a single axis along a direction of the long side on the edges of the liquid crystal panels 2, respectively, where the convex portion 2a and the concave portion 2b are formed.

Figure 5:
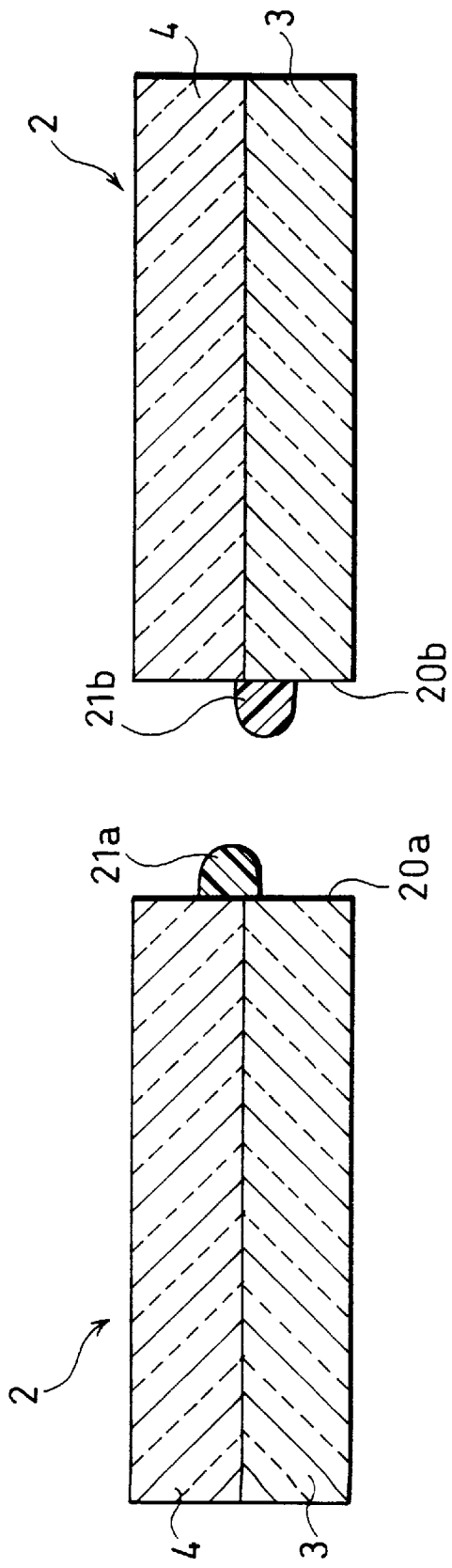
FIG. 5 is an explanatory drawing showing light-shields formed on the liquid crystal panels of the liquid crystal display device of FIG. 2.

FIG. 5 is an explanatory drawing illustrating the light-shields 21 and 21b. As shown in FIG. 5, the light-shield 21a is provided on a portion of an edge surface 20a of one of the liquid crystal panels 2 shifted upward from the center in a direction of thickness (towards CF substrate 4). On the other hand, the light-shield 21b is provided on a portion of an edge surface 20b of the other liquid crystal panel 2 shifted downward from the center in a direction of thickness (towards TFT substrate 3).

Note that, in FIG. 5, the sealant 5 and the liquid crystal 6 are omitted. This is because of the fact that since the thickness of the sealant 5 and the liquid crystal 6 are significantly thinner compared with that of the TFT substrate 3 and the CF substrate 4, the sealant 5 and the liquid crystal 6 play substantially no role in forming of the light-shields 21a and 21b.

The following explains a connected portion of the liquid crystal panels 2 of the liquid crystal display device 1. Note that, in the following explanation, the connected portion will be-referred to as a connected portion 12 (see FIG. 3(*a*)).

As shown in FIG. 2, the liquid crystal panels 2 are bonded with the reinforcing substrate 7 by an adhesive 8. The liquid crystal panels 2 are also bonded with each other by the adhesive 8. Namely, the liquid crystal panels 2 are connected adjacent to each other by the adhesive 8 on the same plane (on the reinforcing substrate 7). The adhesive 8 has a function of adjusting the refractive index. As the material of the adhesive 8, for example, a transparent UV curable adhesive in which curing is promoted by irradiation of UV light is adopted.

Figure 6:
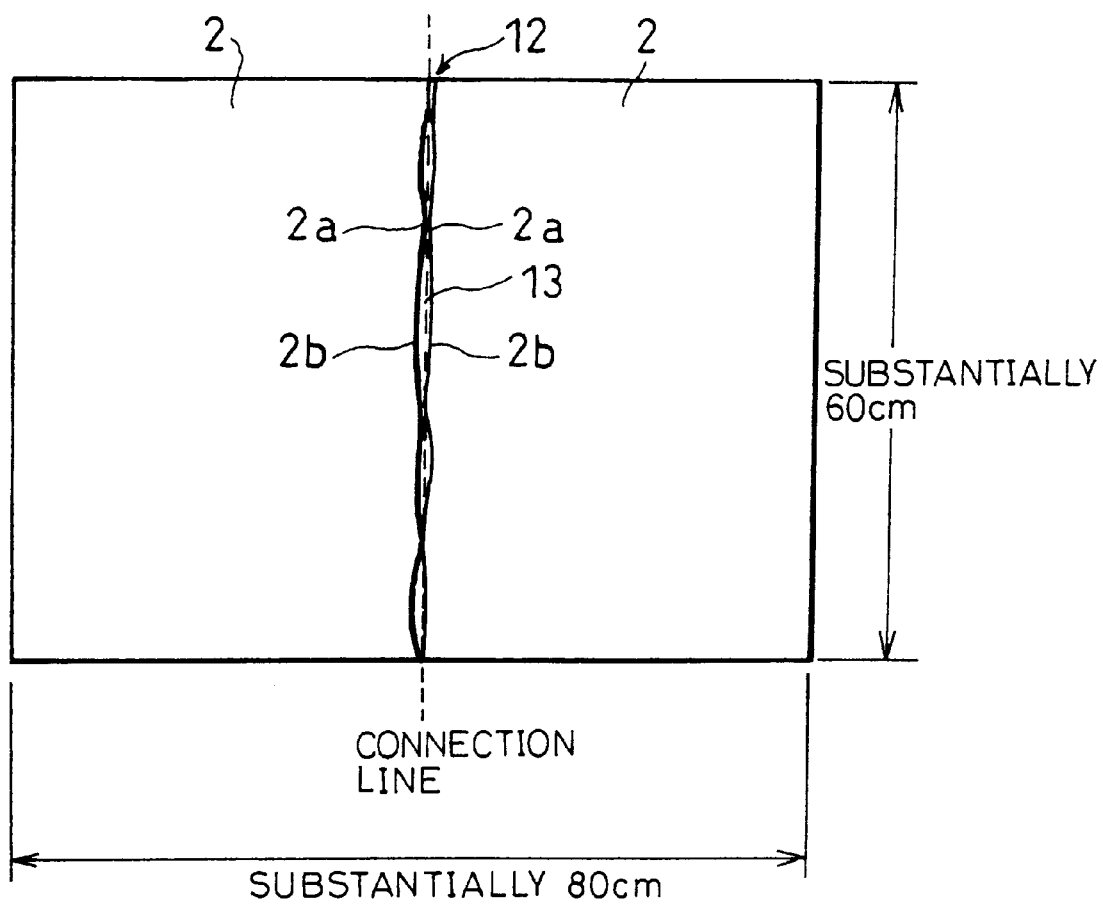
FIG. 6 is an explanatory drawing showing two liquid crystal panels which are connected adjacent to each other.

FIG. 6 is an explanatory drawing showing the liquid crystal panels 2 connected adjacent to each other, as seen from the Z direction of FIG. 4. As described, on each of the edge surfaces 20*a* and 20*b* of the liquid crystal panels 2, respectively, the convex portion 2*a* and the concave portion 2*b* in accordance with the cutting accuracy of the glass substrate are formed. The convex portion 2*a* is a portion closer to a connection line which is the center line of the connected portion, and the concave portion 2*b* is a portion far away from the connection line. As shown in FIG. 6, on the connected portion 12, there are a portion where the convex portions 2*a* face each other, and a portion where concave portions 2*b* face each other.

Figure 1:
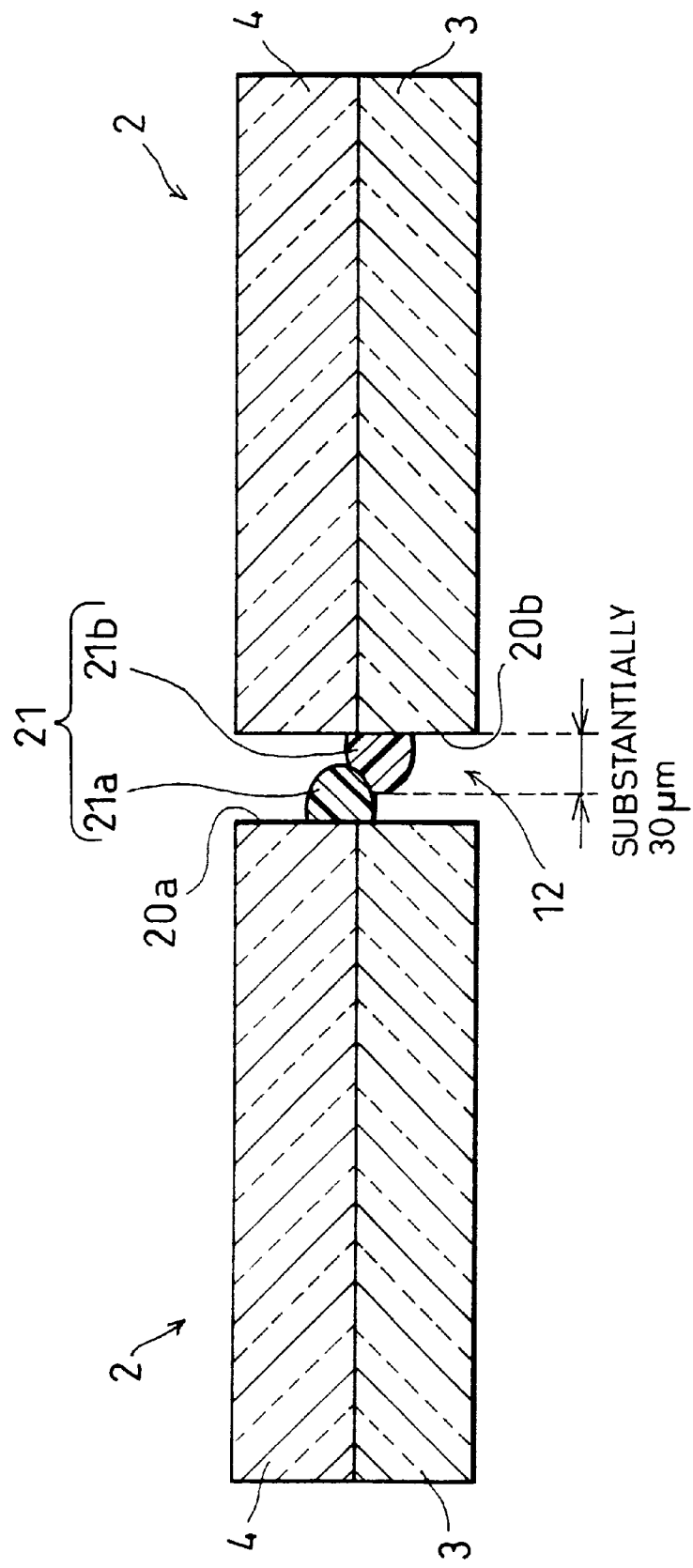
FIG. 1 is an explanatory view showing an arrangement of light-shields at a connected portion of liquid crystal panels which are display panels of an image display device in accordance with one embodiment of the present invention.

FIG. 1 is an explanatory drawing showing the connected portion 12 where the light-shields 21*a* and 21*b* of the liquid crystal panels 2 which are connected adjacent to each other are provided. As shown in FIG. 1, at the connected portion 12, the light-shields 21*a* and 21*b* are respectively shifted in the thickness direction, and are overlapped so as to form a light shielding film 21. The apices (point where the length is maximum in a direction perpendicular with respect to the cutting edge surface) of the light-shields 21*a* and 21*b* do not contact with each other.

Figure 7:
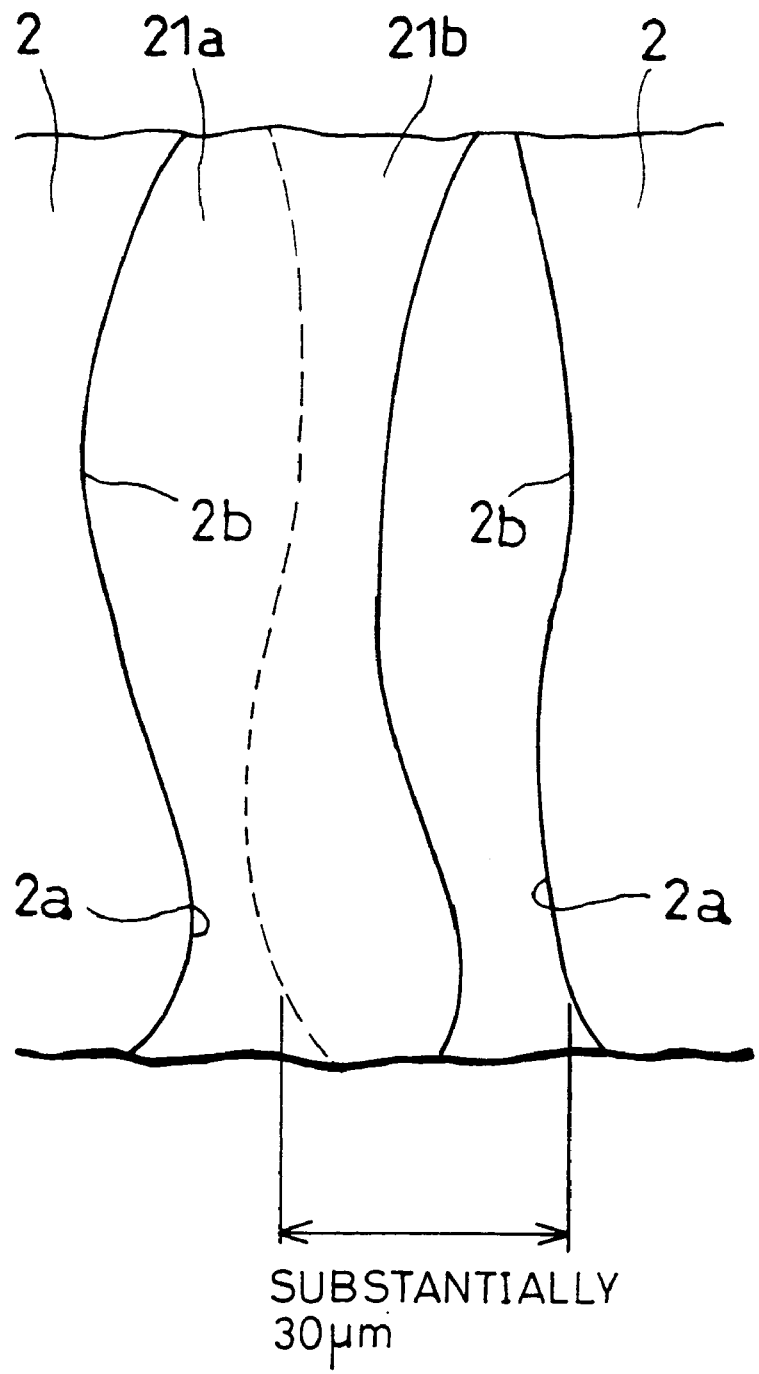
FIG. 7 is an explanatory drawing showing an enlarged connected portion of the two liquid crystal panels of FIG. 6.

FIG. 7 is an explanatory drawing showing the enlarged connected portion 12 of FIG. 6. As shown in FIG. 7, at the connected portion 12, the light-shields 21*a* and 21*b* are provided in an overlapping manner in the thickness direction of the liquid crystal panels 2, and the overlapping of the light-shields 21*a* and 21*b* is made with respect to the entire connected portion 12. Thus, even a portion at the connected portion where the concave portions 2*b* face each other is completely sealed by the light shielding film 21 composed of the light-shields 21*a* and 21*b*.

Namely, in the liquid crystal display device 1, even when a portion where the concave portions 2*b* face each other and a portion where the convex portions 2*a* face each other are formed by the small waviness of the edge surfaces 20*a* and 20*b* constituting the connected portion 12 of the liquid crystal panels 2, the difference of the size of the gap between such portions are cancelled by overlapping of the light-shields 21*a* and 21*b*. Thus, a gap created by the concave portions 2*b* facing each other is sealed by the light shielding film 21 composed of the light-shields 21*a* and 21*b*.

Therefore, in the liquid crystal display device 1, even when waviness is formed on the edge surfaces 20*a* and 20*b* of the liquid crystal panels 2, it is ensured that light is prevented from leaking with respect to the entire connected portion 12.

When, in an actual practice, a 40 inch (approximately 80 cm×60 cm) multi-panel liquid crystal display device was manufactured by connecting adjacent to each other 29 inch (approximately 40 cm×60 cm) liquid crystal panels 2 provided with the light-shields 21*a* and 21*b*, respectively, no leakage of light was observed from the seam of the liquid crystal panels 2, and a liquid crystal display device having a desirable displaying quality with no seam was realized.

Note that, the height of the light-shields 21*a* and 21*b*, namely, the respective lengths from the edge surfaces 20*a* and 20*b* of the liquid crystal panels 2 to the apices of the light-shields 21*a* and 21*b* are determined in accordance with the profile irregularity of the edge surfaces 20*a* and 20*b*. That is to say, the respective heights of the light-shields 21*a* and 21*b* are determined so that the gap created in accordance with the profile irregularity of the edge surfaces 20*a* and 20*b* is sealed by overlapping of the light-shields 21*a* and 21*b*. For example, when the profile irregularity is 20 $\mu$m to 30 $\mu$m, as in FIG. 1, the height of substantially 30 $\mu$m is suitable.

The light-shields 21*a* and 21*b* can be made of, for example, a black silicon rubber including a black pigment such as carbon. As a material of such a black silicon rubber, a liquid rubber which becomes elastic at a temperature in a vicinity of room temperature is suitably adopted. For example, a one-component RTV (Room Temperature Vulcanized) rubber KE44, provided by Shin-Etsu Chemical Co., Ltd., etc., can be adopted as such a liquid rubber.

As a method for forming the light-shields 21*a* and 21*b*, the screen printing method using a mesh board, the dispense profiling method, and other methods are available.

In the screen printing method, a thick film pattern is formed by applying a thick film paste onto a substrate through a mesh board. The screen printing method has an advantage in that the height of the applied thick film paste can be controlled by the thickness of the mesh board used. Thus, by using the screen printing method, it is possible to form the light-shields 21*a* and 21*b* respectively having a desirable height, in accordance with the size of waviness (profile irregularities) of the side edge surfaces at the connected portion 12 of the liquid crystal panels 2. In other words, the respective heights of the light-shields 21*a* and 21*b* can be varied in accordance with the size of waviness on the edge surfaces at the connected portion 12 of the liquid crystal panels 2.

On the other hand, in the dispense profiling method, a paste is dispelled out of a dispenser nozzle so as to be applied onto a substrate. The dispense profiling method has an advantage in that only a minimum amount of paste required is used. Thus, by forming the light-shields 21*a* and 21*b* using the dispense profiling method, it is possible to conserve the material constituting the light-shields 21*a* and 21*b*, and reduce the price and the manufacturing cost of the liquid crystal display device. Note that, in the case of adopting the dispense profiling method, in order to make the height of applied paste uniform after profiling, it is preferable to operate an applied height sensing mechanism which detects real time the irregularities on the applied surface.

It is preferable that the adhesive 8 has a refractive index which is substantially the same as the refractive index of two glass substrates constituting the TFT substrate 3 and the CF substrate 4, respectively. Namely, when the refractive index of the two glass substrates is n, the adhesive 8 has a refractive index of n±0.01 n.

For example, as described above, in the case where the TFT substrate 3 and the CF substrate 4 are made of barium borosilicate glass 7059, it is preferable to use an adhesive 8 having a refractive index of substantially 1.53. By using an adhesive 8 having such a refractive index, it is possible to prevent refraction, reflection, and scattering of light passing through the connected portion 12, which are caused by the convex portion 2a and the concave portion 2b of the edge surfaces 20a and 20b of the liquid crystal panels 2. As a result, the connected portion 12 does not become noticeable, thus improving the displaying characteristics of the liquid crystal display device.

It is preferable that the width of the connected portion 12 between the liquid crystal panels 2 is set in the following manner. Namely, the connected portion 12 is formed in such a manner that the pixel pitch (distance between pixels) separated by the connected portion 12 is the same as the pixel pitch in the liquid crystal panel 2. This further prevents undesirable effects generated at the connected portion 12, and realizes natural displaying.

Figure 11:
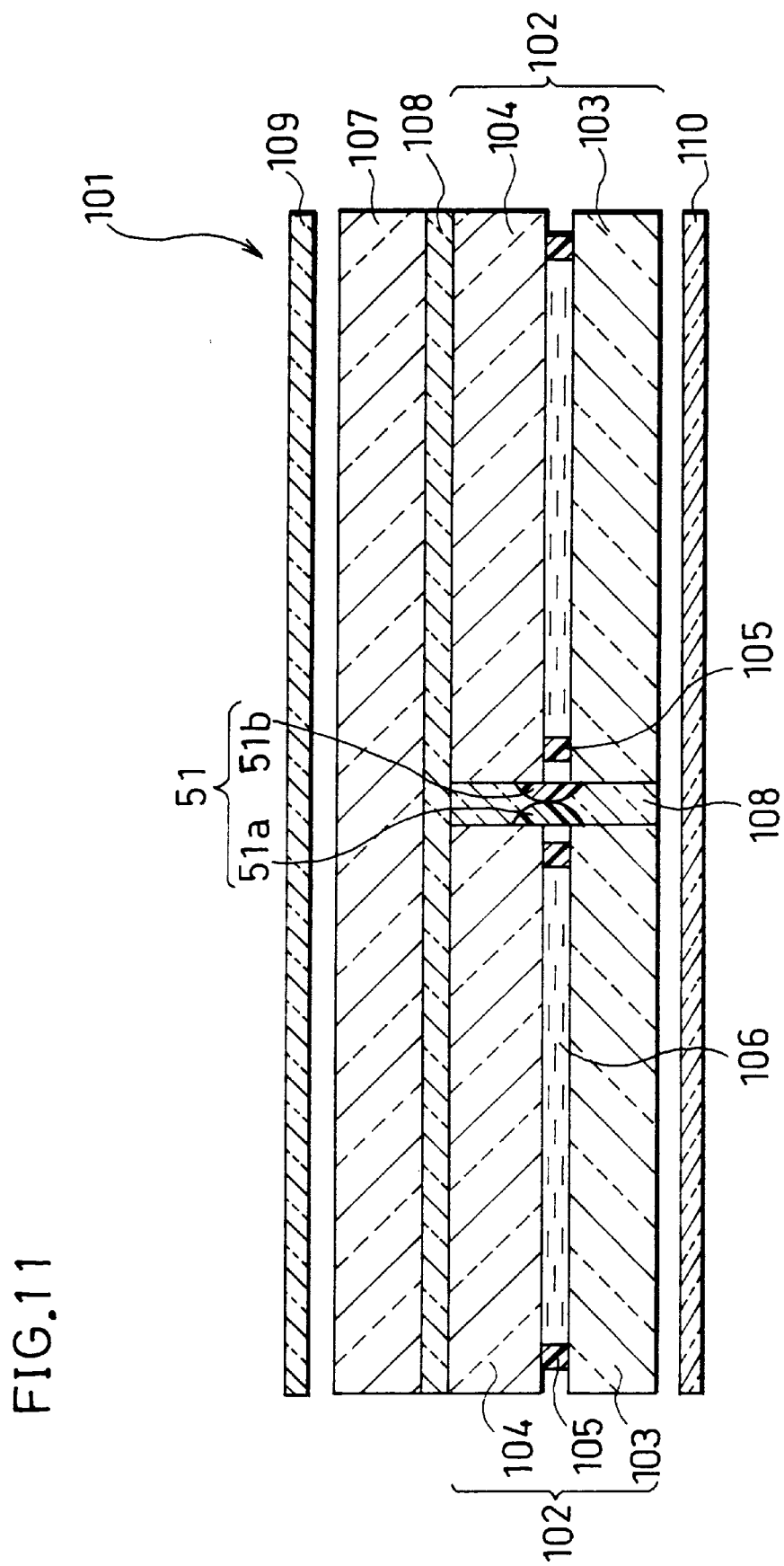
FIG. 11 is a cross sectional view showing an arrangement of a liquid crystal display device as a conventional image display device.
Figure 12:
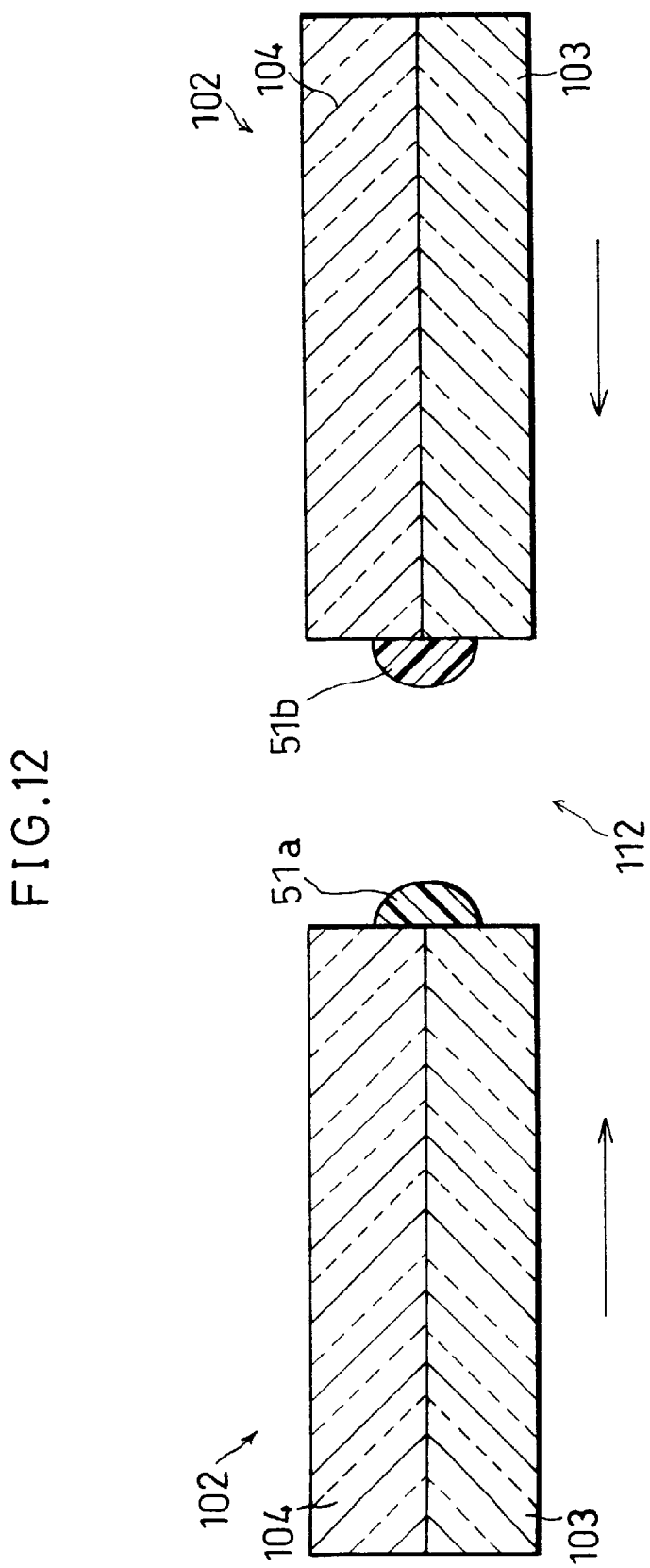
FIG. 12 is an explanatory drawing showing positions of light-shields of the liquid crystal display device of FIG. 11, and two liquid crystal panels provided with the light-shields before connected adjacent to each other.
Figure 13:
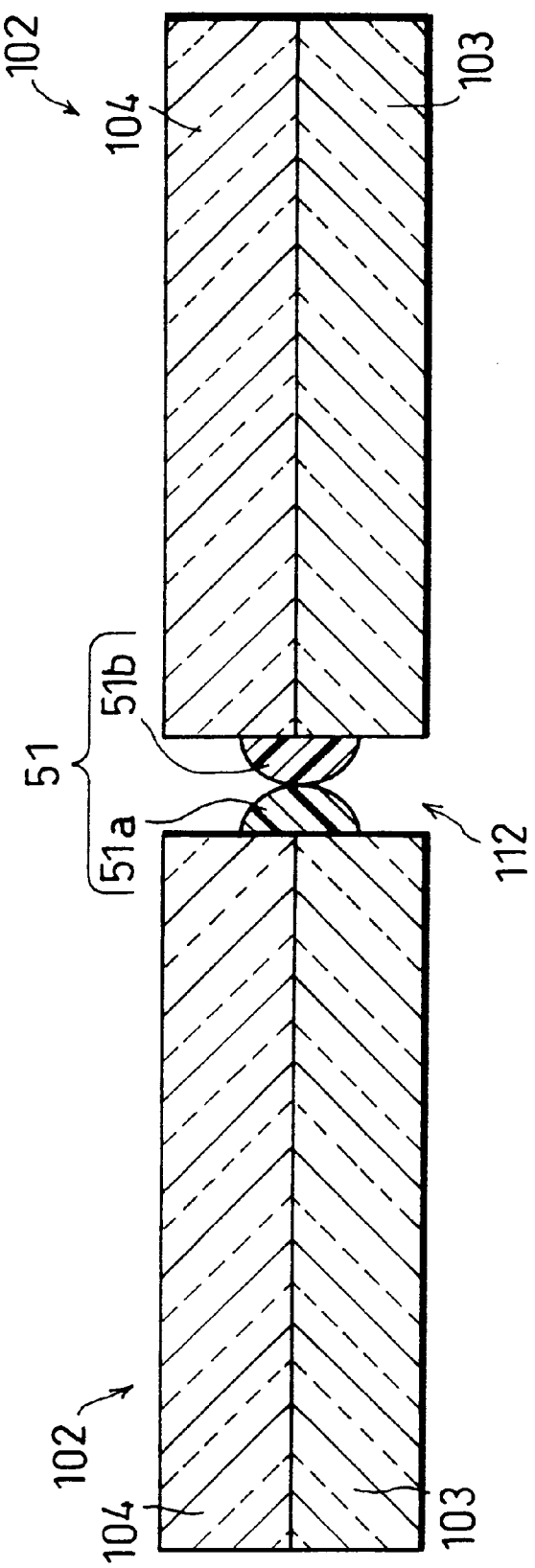
FIG. 13 is an explanatory drawing showing the liquid crystal panels of FIG. 12 which are connected adjacent to each other.
Figure 14:
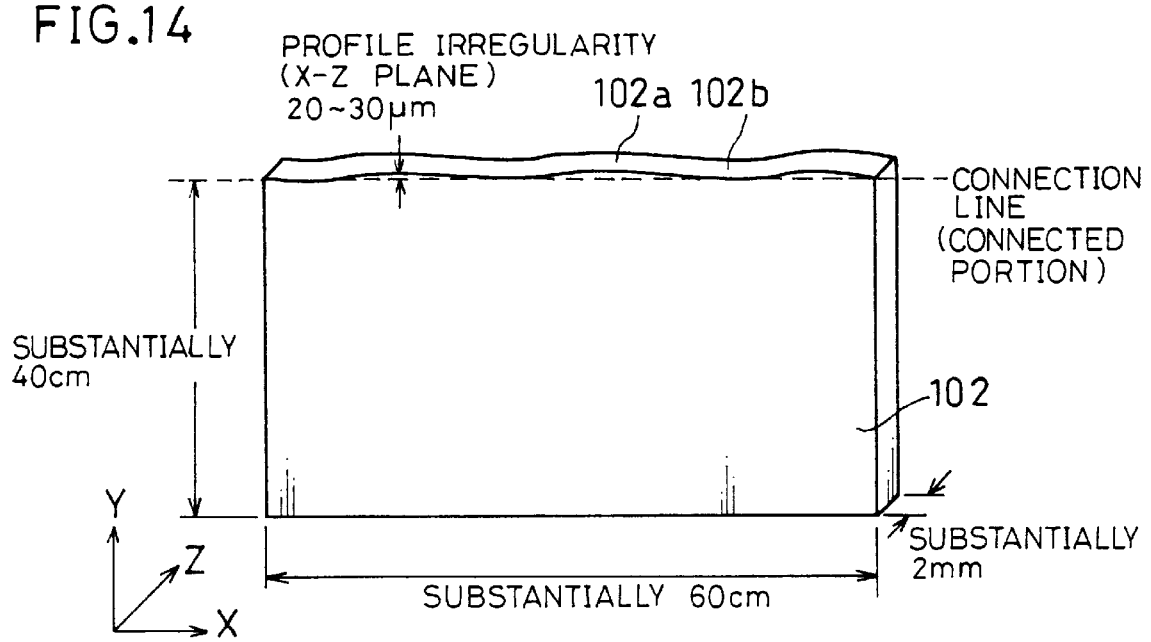
FIG. 14 is an explanatory drawing showing a glass substrate which was cut with a diamond blade.
Figure 15:
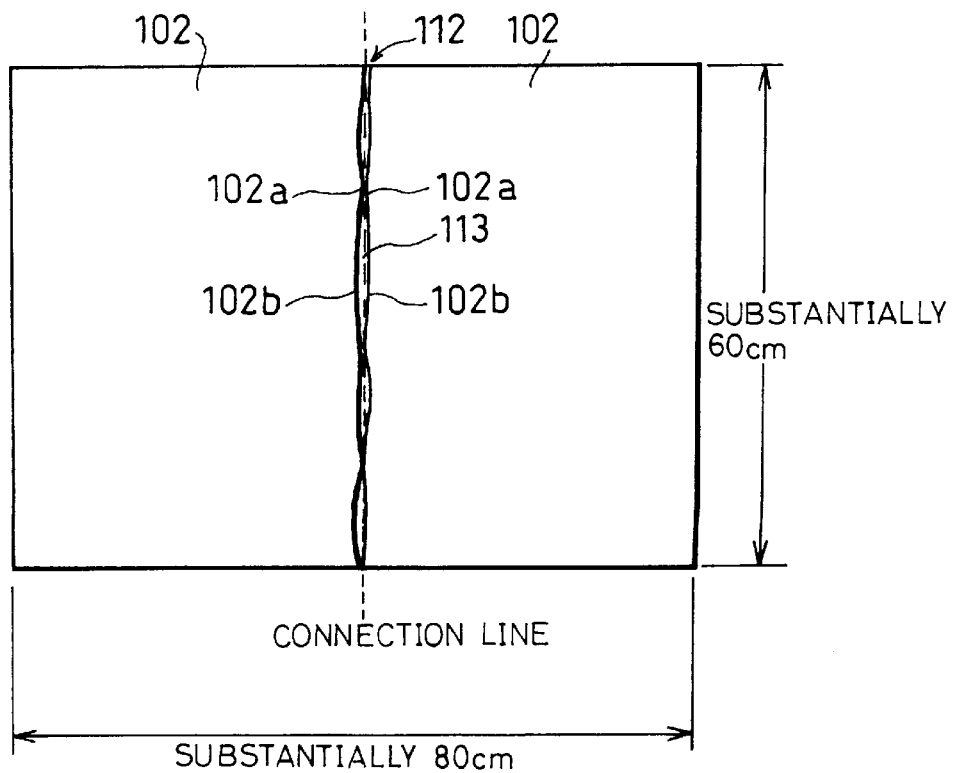
FIG. 15 is an explanatory drawing showing conventional two liquid crystal panels which are connected adjacent to each other.

In order to have the described arrangement, it is important that a desired value can be set for the width of the connected portion 12. As described, in the liquid crystal display device 1, since the light-shields 21a and 21b are overlapped, compared with the conventional liquid crystal display device as shown in FIG. 11, it is possible to narrow the width of the connected portion 12 by a large amount. Also, as far as the length of the light-shields 21a and 21b allows, the width of the connected portion 12 can be made wider. Therefore, a desired value can be given to the pixel pitch separated by the connected portion 12, namely, it is possible to make the pixel pitch separated by the connected portion 12 the same as the pixel pitch in the liquid crystal panel 2.

When, in an actual practice, a 40 inch (approximately 80 cm×60 cm) multi-panel liquid crystal display device was manufactured by connecting adjacent to each other 29 inch (approximately 40 cm×60 cm) liquid crystal panels 2 so that the pixel pitch separated by the connected portion 12 is the same as the pixel pitch inside the liquid crystal panel 2, no leakage of light was observed from the seam of the liquid crystal panels 2, and a liquid crystal display device having a desirable displaying quality with no seam was realized.

Also, in the liquid crystal display device 1, since the width of the connected portion 12 can be made extremely narrow, the pixel pitch is not limited by the width of the connected portion 12. Thus, by narrowing the pixel pitch of the liquid crystal panels 2, it is possible to have an arrangement which easily meets the demand for higher resolution. Namely, in the liquid crystal display device 1, the resolution of the entire screen can be improved with ease from SVGA (Super Video Graphics Array) having 600×800 pixels to XGA (Extended Video Graphics Array) having 768×–1024 pixels.

Note that, in the liquid crystal display device 1, the number and the position of light-shields are not limited to the arrangement of FIG. 1. As long as the light-shields are provided in an overlapping manner at the connected portion of the liquid crystal panels, any arrangements can be adopted.

Figure 8:
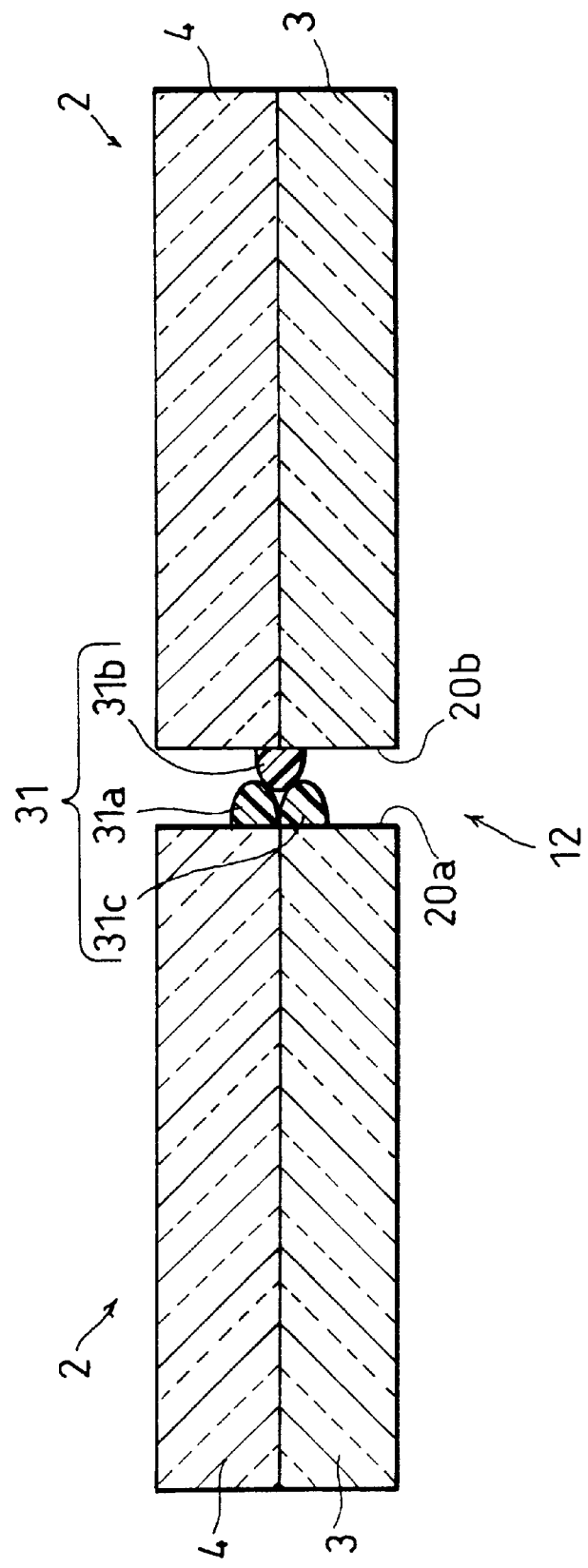
FIG. 8 is an explanatory drawing showing other light-shields which can be formed on the liquid crystal panels of the liquid crystal display device of FIG. 2.

For example, as shown in FIG. 8, it is possible to adopt an arrangement wherein light-shields 31a and 31c are provided on the edge surface 20a of one of the liquid crystal panels 2, and a light-shield 31b is provided on the edge surface 20b of the other liquid crystal panel 2. The light-shields 31a and 31c are provided on the edge surface 20a in stripes (in parallel) on a portion shifted upward and downward respectively from the center in the thickness direction of the liquid crystal panel 2. The light-shield 31b is provided on the center of the edge surface 20b in the thickness direction of the liquid crystal panel 2. The material and the forming method of the light-shields 31a, 31b, and 31c are the same as that of the light-shields 21a and 21b.

With this arrangement, it is also possible to have an arrangement wherein the light-shields 31a, 31b, and 31c are overlapped-one another with respect to the entire connected portion 12 of the liquid crystal panels 2. Thus, the gap created by adjacent concave portions 2b can be sealed by a light shielding film 31 composed of the light-shields 31a, 31b, and 31c. This arrangement ensures that leakage of light is prevented with respect to the entire connected portion 12, and that a desired value can be set for the width of the connected portion 12.

When, in an actual practice, a 40 inch (approximately 80 cm×60 cm) multi-panel liquid crystal display device was manufactured by connecting adjacent to each other 29 inch (approximately 40 cm×60 cm) liquid crystal panels 2 provided with the light-shields 31a, 31b, and 31c, no leakage of light was observed from the seam of the liquid crystal panels 2, and a liquid crystal display device having a desirable displaying quality with no seam was realized.

It is also possible to adopt an arrangement wherein a plurality of light-shields are provided on the edge surface 20a of one of the liquid crystal panels 2 and on the edge surface 20b of the other liquid crystal panel 2, and the light-shields on the edge surfaces 20a and 20b are overlapped on top of one another alternately.

In the present embodiment, the liquid crystal display device 1 has an arrangement wherein only one side of the liquid crystal panels 2 which are connected to each other on the edge surfaces is combined with the reinforcing substrate 7. However, the liquid crystal display device 1 may have an arrangement wherein the both sides of the liquid crystal panels 2 are combined with the reinforcing substrate 7 so that the liquid crystal panels 2 are sandwiched between two reinforcing substrates 7. Also, the number of liquid crystal panels 2 provided in the liquid crystal display device 1 is not limited to two so that three or more liquid crystal panels may be provided.

Also, in the liquid crystal display device 1, the liquid crystal panels 2 adopt the TFT element as the active element. However, the MIM (Metal Insulator Metal) element may be adopted instead.

Also, the technique for cutting the glass substrate, from which the TFT substrate 3 and the CF substrate 4 of the liquid crystal panel 2 are made, is not limited to the dicing technique, so that it is possible to adopt the diamond scribing technique or the laser scribing technique.

Figure 9:
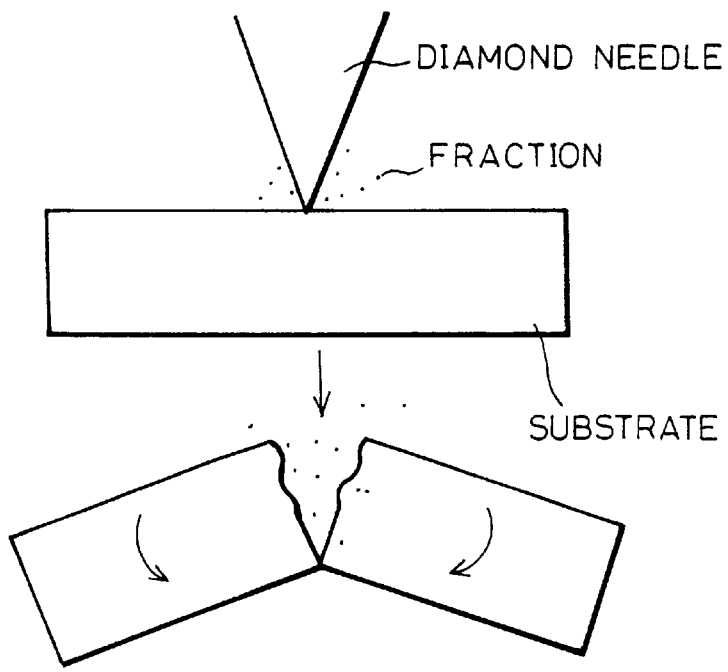
FIG. 9 is an explanatory drawing showing how a glass substrate in cut by a diamond scribing technique.

In the diamond scribing technique, as shown in FIG. 9, a line is profiled on the surface of a target substrate to be cut by a diamond needle, and the substrate is separated by mechanically applying a bending stress. The diamond scribing technique offers a processing accuracy of several hundred $\mu$m.

Figure 10:
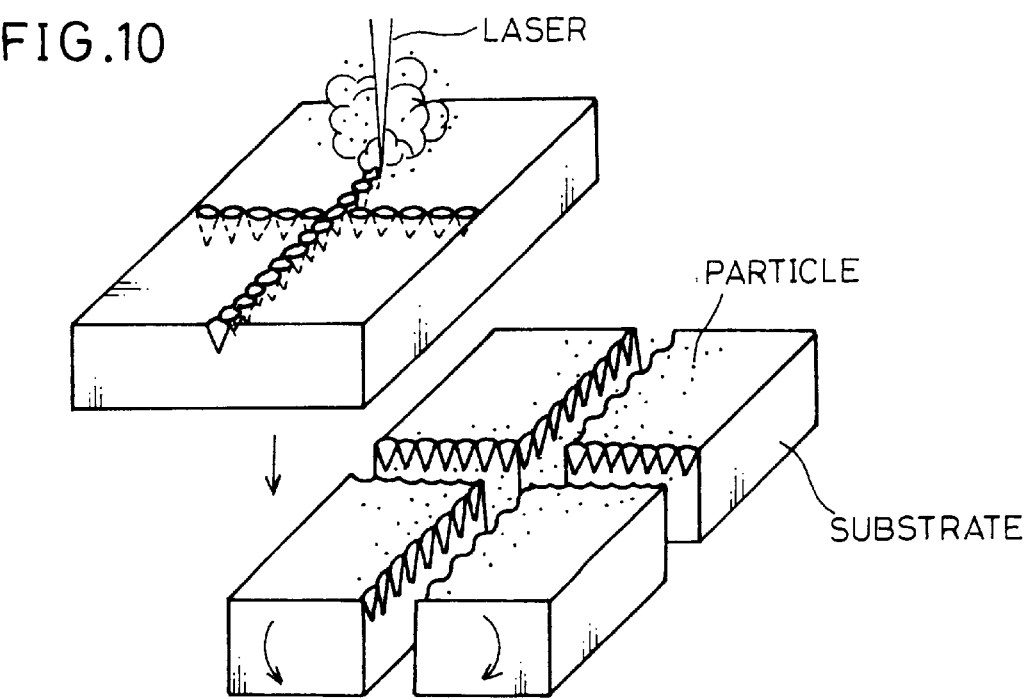
FIG. 10 is an explanatory drawing showing how a glass substrate in cut by a laser scribing technique.

In the laser scribing technique, as shown in FIG. 10, a laser beam is projected along a line on the surface of a substrate to be cut so as to melt and evaporate the substrate surface, and after forming grooves, the substrate is separated by mechanically applying a bending stress. The laser scribing technique offers a processing accuracy of several hundred $\mu$m.

In the present embodiment, as the image display device of the present invention, the liquid crystal display device 1 is adopted, wherein the light-shields 21a and 21b or the light-shields 31a, 31b, and 31c are provided at the connected portion 12 of the liquid crystal panels 2. However, the image display device of the present invention is not limited to a liquid crystal display device. Namely, the image display device of the present invention can also be adopted in an image display device wherein the light-shields 21a and 21b or the light-shields 31a, 31b, and 31c are provided on the edge portions of flat display panels such as PDP (Plasma Display Panel) and FED (Field Emission Display), and a plurality of such display panels are connected adjacent each other so as to realize a large screen.

As described, a first liquid crystal display device of the present invention for carrying out large screen displaying in which a plurality of liquid crystal panels, whose side edge surfaces are provided with the light-shields which prevent light form leaking from the connected portion of adjacent liquid crystal panels, are connected adjacent to one another on the same plane has an arrangement wherein the light-shields are provided on the side edge surfaces at the connected portion of the liquid crystal panels so that the light shields overlap one another at the connected portion of the liquid crystal panels.

With this arrangement, since the side edge surfaces of at the connected portion of the liquid crystal panels are provided with the light-shields so that the light-shields overlap at the connected portion of the liquid crystal panels, even when a plurality of liquid crystal panels whose side edge surfaces have small waviness are connected adjacent to one another, it is ensured, by the light-shields, that the light is prevented from leaking from the gap between the liquid crystal panels.

Namely, on the side edge surfaces of the liquid crystal panels, even when the liquid crystal panels are cut by the dicing technique which offers an excellent processing accuracy, small waviness is formed on the cutting edge surfaces. This causes the convex portions and the concave portions on the side edge surfaces at the connected portion of the liquid crystal panels to be adjacent to each other respectively when connecting the plurality of liquid crystal panels adjacent to one another.

In the conventional arrangement, the light-shields are provided on the side edge surfaces of the liquid crystal panels so that the apices of the light-shields are in contact with each other at the connected portion of the liquid crystal panels. While this arrangement prevents, by the light-shields, leakage of light at the portion where the convex portions on the side edge surfaces at the connected portion of the liquid crystal panels are adjacent to each other, at the portion where the concave portions are adjacent to each other, due to the fact that the apices of the light-shields are in contact with each other at the portion where the convex portions are adjacent to each -other, the gap width between the liquid crystal panels cannot be made narrower. As a result, leakage of light is caused at the gap between the liquid crystal panels.

In contrast, in the described arrangement of the present invention, at the connected portion of the liquid crystal panels, the light-shields are overlapped each other instead of the apices of the light-shields contacting with each other; thus, the gap between adjacent liquid crystal panels are made narrower than the conventional arrangement by the overlap. As a result, the gap at the portion where the concave portions on the side edge surfaces of the liquid crystal panels are adjacent to each other is completely sealed by the light-shields provided between the concave portions.

In this manner, with the described arrangement, even when the convex portions or the concave portions on the side edge surfaces at the connected portion of the liquid crystal panels are adjacent to each other, the level difference of the convex portion and the concave portion is cancelled by overlapping of light-shields, and the gap where the concave portions are adjacent to each other is sealed. Thus, even when small waviness is formed on the side edge surfaces of the liquid crystal panels, it is ensured that leakage of light is prevented with respect to the entire connected portion of the liquid crystal panels.

Also, by overlapping of light-shields, the gap between adjacent liquid crystal panels are made narrower compared with the conventional arrangement. This allows the pixel pitch, which is restricted by the connection width between liquid crystal panels, to be made narrower, making it possible to meet the demand for higher resolution with ease. Namely, the resolution of the entire screen can be improved with ease from SVGA (Super Video Graphics Array) having 600×800 pixels to XGA (Extended Video Graphics Array) having 768×1024 pixels.

A second liquid crystal display device, having the arrangement of the first liquid crystal display device, has an arrangement wherein a light-shield is provided on the side edge surface of one of the liquid crystal panels on a portion shifted upward in the thickness direction from the center, and another light-shield is provided on the side edge surface of the other liquid crystal panel on a portion shifted downward in the thickness direction from the center.

With this arrangement, when connecting the plurality of liquid crystal panels adjacent to one another, at the connected portion of the liquid crystal panels, the light-shield positioned shifted upward in the thickness direction from the center of one of the liquid crystal panels and the light-shield positioned shifted downward in the thickness direction from the center of the other liquid crystal panel overlap each other. As a result, at the portion where the convex portions on the side edge surfaces at the connected portion of the liquid crystal panels are adjacent to each other, the gap between the liquid crystal panels is made narrower compared with the conventional arrangement by the overlap of the light-shields. Thus, the gap at the portion where the concave portions on the side edge surfaces at the connected portion of the liquid crystal panels is completely sealed by the light-shields between the concave portions. Therefore, even when waviness is formed on the side edge surfaces at the connected portion of the liquid crystal panels, it is ensured that leakage of light is prevented with respect to the entire connected portion of the liquid crystal panels.

A third liquid crystal display device, having the arrangement of the first liquid crystal display device, has an arrangement wherein light-shields are provided on the side edge surface of one of the liquid crystal panels on a portion shifted upward and on a portion shifted downward in the thickness direction from the center, respectively, and another light-shield is provided on the center in the thickness direction of the side edge surface of the other liquid crystal panel.

With this arrangement, when connecting the plurality of liquid crystal panels adjacent to one another, at the connected portion of the liquid crystal panels, the light-shields of one of the liquid crystal panels, respectively provided on the portion shifted upward and on the portion shifted downward in the thickness direction from the center and the light-shield of the other liquid crystal panel, provided on the center in the thickness direction overlap each other. As a result, at the portion where the convex portions on the side edge surfaces at the connected portion of the liquid crystal panels are adjacent to each other, the gap between the liquid crystal panels is made narrower compared with the conventional arrangement by the overlap of the light-shields. Thus, the gap at the portion where the concave portions on the side edge surfaces at the connected portion of the liquid crystal panels is completely sealed by the light-shield between the concave portions. Therefore, even when waviness is formed on the side edge surfaces at the connected portion of the liquid crystal panels, it is ensured that leakage of light is prevented with respect to the entire connected portion of the liquid crystal panels.

A fourth liquid crystal display device of the present invention, having the arrangement of either one of first through third liquid crystal display devices, has an arrangement wherein the light-shields are made by the screen printing method.

With this arrangement, since the screen printing method is adopted, it is possible to control the thickness (height of light-shield from the side edge surface of liquid crystal panel) of the paste in accordance with the thickness of the mesh board used. This makes it possible to form with ease a light-shield having a predetermined height in accordance with the size of waviness on the side edge surfaces of the liquid crystal panels, thus allowing a flexible response to be taken in accordance with the size of waviness.

A fifth liquid crystal display device having the arrangement of either one of first through third liquid crystal display devices has an arrangement wherein the light-shields are made by the dispense profiling method.

With this arrangement, since the dispense profiling method is adopted, only a minimum amount of paste required is used. Thus, it is possible to conserve the material constituting the light-shield, and reduce the price and the manufacturing cost of the liquid crystal display device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image display device, comprising:
   a plurality of display panels connected to one another so as to constitute a large screen;
   a light-shield provided on an edge of each of said plurality of display panels;
   wherein said light-shield is provided so as to be overlapped with one another at a connected portion of said plurality of display panels adjacent to one another; and
   wherein at the connected portion of said plurality of display panels adjacent to one another, said light-shield of one of said plurality of display panels is provided on a portion shifted upward in a thickness direction from a center, and said light-shield of the other of said plurality of display panels is provided on a portion shifted downward in a thickness direction from a center.

2. An image display device, comprising:
   a plurality of display panels connected to one another so as to constitute a large screen;
   a light-shield provided on an edge of each of said plurality of display panels;
   wherein said light-shield is provided so as to be overlapped with one another at a connected portion of said plurality of display panels adjacent to one another; and
   wherein at the connected portion of said plurality of display panels adjacent to one another, said light-shield of one of said plurality of display panels is provided in plurality side by side in a thickness direction, and said light-shield of the other of said plurality of display panels is provided so as to be overlapped with said light-shield provided in plurality.

3. An image display device, comprising:
   a plurality of display panels connected to one another so as to constitute a large screen;
   a light-shield provided on an edge of each of said plurality of display panels;
   wherein said light-shield is provided so as to be overlapped with one another at a connected portion of said plurality of display panels adjacent to one another; and
   wherein at the connected portion of said plurality of display panels adjacent to one another, said light-shield of one of said plurality of display panels is provided in plurality on a portion shifted upward and on a portion shifted downward in a thickness direction from a center, and said light-shield of the other of said plurality of display panels is provided on a center in a thickness direction.

4. The image display device as set forth in any one of claims 1–3, wherein said light-shield is made by a screen printing method.

5. The image display device as set forth in any one of claims 1–3, wherein said light-shield is made by a dispense profiling method.

6. The image display device as set forth in any one of claims 1–3, wherein the edge of each of said plurality of display panels provided with said light-shield is processed by a dicing technique using a diamond blade.

7. The image display device as set forth in any one of claims 1–3, wherein the edge of each of said plurality of display panels provided with said light-shield is processed by a diamond scribing technique.

8. The image display device as set forth in any one of claims 1–3, wherein the edge of each of said plurality of display panels provided with said light-shield is processed by a laser scribing technique.

9. The image display device as set forth in any one of claims 1–3, wherein said light-shield is made of a black silicon rubber.

10. The image display device as set forth in any one of claims 1–3, wherein a distance between pixels separated by the connected portion of said plurality of display panels adjacent to one another is equal to a distance between adjacent pixels in a display panel.

11. The image display device as set forth in any one of claims 1–3, wherein said plurality of display panels are provided between two polarizing plates whose polarization axes are orthogonal to each other.

12. The image display device as set forth in any one of claims 1–3, wherein said plurality of display panels are bonded with a substrate by an adhesive having a refractive index substantially the same as a refractive index of glass constituting said plurality of display panels.

13. The image display device as set forth in any one of claims 1–3, wherein said plurality of display panels are liquid crystal panels.

14. The image display device as set forth in any one of claims 1–3, wherein said plurality of display panels are plasma display panels.

15. The image display device as set forth in any one of claims 1–3, wherein said plurality of display panels are field emission display panels.

16. The image display device as set forth in any one of claims 1–3, wherein light-shields provided on opposing edges of adjacent display panels are respectively shifted in a thickness direction.

17. The image display device as set forth in any one of claims 1–3, wherein apices of light-shields provided on opposing edges of adjacent display panels do not contact each other.

18. The image display device as set forth in any one of claims 1–3, wherein said light-shield provided on the edge of each of said plurality of panels is sized such that the light-shields on opposing edges of adjacent display panels are overlapped even in the case where there is differences in size of a gap between the adjacent display panels due to profile irregularity in a surface of at least one of said opposing edges.

\* \* \* \* \*